United States Patent [19]
Gilbert et al.

[11] Patent Number: 5,297,144
[45] Date of Patent: Mar. 22, 1994

[54] RESERVATION-BASED POLLING PROTOCOL FOR A WIRELESS DATA COMMUNICATIONS NETWORK

[75] Inventors: Sheldon L. Gilbert, San Diego, Calif.; Carolyn L. Heide, Lincolnshire; Dennis L. Director, Wilmette, both of Ill.

[73] Assignee: Spectrix Corporation, Evanston, Ill.

[21] Appl. No.: 643,875

[22] Filed: Jan. 22, 1991

[51] Int. Cl.$^5$ .............................................. H04J 3/16
[52] U.S. Cl. ................................. 370/95.2; 370/94.1; 359/118
[58] Field of Search ............... 370/95.1, 95.2, 85.8, 370/109, 85.6, 93; 340/825.08, 825.5, 825.51, 825.52, 539, 825.54, 825.31; 395/725; 359/136, 172, 143, 174, 118, 119; 375/3; 235/382; 379/91, 106; 210/742; 358/84; 455/31.1, 34.1

[56] References Cited

U.S. PATENT DOCUMENTS

| | | | |
|---|---|---|---|
| 3,725,787 | 4/1973 | Featherston | 375/3 |
| 4,097,727 | 6/1978 | Ulch | 235/382 |
| 4,251,865 | 2/1981 | Moore et al. | 370/95.2 |
| 4,287,592 | 9/1981 | Paulish et al. | 370/92 |
| 4,367,458 | 1/1983 | Hackett | 340/539 |
| 4,477,809 | 10/1984 | Bose | 340/825.54 |
| 4,536,838 | 8/1985 | Ringel et al. | 370/95.2 |
| 4,601,064 | 7/1986 | Shipley | 359/172 |
| 4,750,199 | 6/1988 | Norwich | 379/91 |
| 4,809,257 | 2/1989 | Gantenbein et al. | 359/136 |
| 4,809,268 | 2/1989 | Tejima et al. | 370/93 |
| 4,829,560 | 5/1989 | Evanyk et al. | 379/106 |
| 4,830,757 | 5/1989 | Lynch et al. | 210/742 |
| 4,839,640 | 6/1989 | Ozer et al. | 340/825.31 |
| 4,905,080 | 2/1990 | Watanabe et al. | 358/84 |
| 4,912,705 | 3/1990 | Paneth et al. | 370/109 |
| 4,940,974 | 7/1990 | Sojka | 370/95.2 |
| 4,951,281 | 8/1990 | Muto et al. | 370/95.2 |
| 5,010,329 | 4/1991 | Nagakura | 370/95.2 |
| 5,046,066 | 9/1991 | Messenger | 370/95.2 |
| 5,061,922 | 10/1991 | Nishijima et al. | 370/95.2 |
| 5,103,448 | 4/1992 | Barnes et al. | 370/95.2 |

OTHER PUBLICATIONS

Li, Victor O. K., "Multiple Access Communications Networks", *IEEE Communications Magazine*, Jun. 1987, vol. 25, No. 6, pp. 41–48.

Lessard, Arthur et al., "Wireless Communications in the Automated Factory Environment", *IEEE Network*, May 1988, vol. 2, No. 3, pp. 64–69.

Ruben, Izhak et al., "Media Access Control for High-Speed Local Area and Metropolitan Area Communications Networks", *Proceedings of the IEEE*, vol. 78, No. 1, Jan. 1990, pp. 168–203.

Lee et al., U.S. Pat. No. 5,099,346, filed Jan. 27, 1988, entitled: "Infrared Communications Network".

*Primary Examiner*—Douglas W. Olms
*Assistant Examiner*—Dang Ton

[57] ABSTRACT

A wireless data communications network having a number of users communicating from individual remote stations to a central station over a single optical-infrared channel utilizing a two-stage noncontention-based multiple-access communications protocol. During the first stage of the reservation-based polling protocol, the central station provides a synchronization signal to the remote stations to define the start of a "reservation request period," and allocates fixed time slots during which any remote station having a data message to transmit may request access and reserve a portion of the channel for their data messages. During the second stage or "polled data transfer period," the central station polls only those remote stations that have a data message to transmit and have requested access to the channel. In response to the poll, the polled remote stations transmit their data message in their previously-reserved data slots. If desired, the central station may also return an acknowledgement signal to the remote stations upon successful reception of each data message.

6 Claims, 5 Drawing Sheets

RESERVATION-BASED POLLING PROTOCOL FOR A WIRELESS DATA COMMUNICATIONS NETWORK

BACKGROUND OF THE INVENTION

This invention generally relates to the field of data communications networks. More particularly, this invention pertains to a noncontention-based multiple access protocol for a data communications network having a number of users communicating from individual remote stations to a central station over a single optical infrared channel.

A multipoint digital communications network typically consists of a number of remote stations which communicate with a central station over one or more two-way communications channels. For example, personal computers are typically connected to a wide variety of peripherals or other computers via wire cables, i.e., a hard-wired communications link. Moreover, local area networks (LAN's) are often used to integrate remote terminals that are located at the same site. Depending upon the number of users, distance between terminals, number of peripherals, frequency of system reconfiguration, portability of the remote stations, etc., the hard-wired cable system may not be practical for a given application. Hence, various wireless communication technologies have been employed, particularly when a system includes a large number of users and/or portable, hand-held computer devices.

Among the more common wireless technologies are narrowband radio frequency (RF) systems, spread spectrum RF, ultrasonic, and infrared optical. Radio frequency systems are often significantly degraded by electromagnetic noise and interference, as well as by large signal amplitude variations and multipath interference. Moreover, RF systems are typically subject to governmental licensing and regulation. Alternative wireless systems employing ultrasonic sound waves experience severe problems with the complete loss of signals due to nulls in the transmission path.

Optical-infrared communications, however, is not affected by electromagnetic interference, and is much less susceptible to multipath interference. Furthermore, optical systems are inherently secure (since the infrared light does not penetrate walls), have no known health or safety effects, and are not subject to F.C.C. regulation. Moreover, infrared transceivers draw relatively low currents, which is particularly important with respect to hand-held battery-powered portable computers. Thus, the use of infrared light as the wireless medium is well suited to such applications.

In order for the remote stations to communicate with the central station, the remote stations must be able to gain access to the commonly-shared communications channel using some type of multiple-access signalling or control protocol As used in the data communications field, a "protocol" is a formal set of rules governing the format and control of inputs and outputs between two communicating devices in order to ensure the orderly transfer of information. Typical multiple-access protocols may be categorized into two broad classes: contention-based protocols (i.e., random access), and noncontention-based protocols, (i.e., scheduled access). Contention-based protocols are characterized in that any remote user with a data message can contend for the channel by transmitting its data message immediately in an on-demand fashion, taking the chance that no other remote stations will transmit at the same time and thus collide with it. When a collision occurs, the data message is seldom received correctly, if at all. Since there is no coordination between contending remote stations, the number of collisions dramatically increases as the number of users increase, or as the channel load increases. Hence, contention-based protocols are not suitable for many data communications applications.

Noncontention-based protocols are characterized in that they provide the necessary coordination between the remote stations to ensure that no two remote stations transmit at the same time to contend for the channel. In other words, the users in a noncontention system take turns accessing the network in an orderly fashion such that collisions between users are avoided. Noncontention channel access is usually implemented using some type of polling technique, wherein the central station sends a control message or synchronization signal to the remote stations as an indication for the remote to respond by transmitting data on the channel.

Using the well-known "explicit polling" technique, the central controller sends a polling signal to each remote station, individually, to inquire if the remote has any information to send. A "poll list" of remote station addresses is used by the central controller to determine when a remote station is to be polled. If the polled remote station doesn't have a data message to send over the channel, the central controller goes on to poll the next remote. If the remote station does have a message to send, the data message is immediately transmitted over the channel in response to the poll. As used herein, the term "polling" includes the second-half of the procedure, wherein the polled stations return a message. Explicit polling has traditionally been considered rather inefficient, since each remote station has to wait for its individualized poll, establish bit and character synchronization, and then transmit its data message in response to the poll. Hence, a significant portion of the overall channel capacity is consumed by the polling signals themselves.

Another noncontention-based multiple-access protocol is referred to as "implicit polling." Under the implicit polling technique, each timing cycle on the channel is divided into a number of time slots, and a specific time slot within each cycle is reserved for a particular remote station. Each remote station, which is synchronized in time with the central station, is implicitly granted access to the channel during its individual time slot. In other words, the channel access is controlled by reserving time slots for each remote station to transmit, rather than being controlled by explicit polling signals from the central station.

In multipoint data communications networks using the implicit polling protocol, a fixed transmission time slot is reserved for each remote station in the network. Each time slot must be of a sufficient length to contain an entire data message packet. Hence, the channel is efficiently utilized only if each remote station has a data message to send during each cycle. If, however, only a few of the remote stations have messages to send during each cycle, then the channel remains idle during the preassigned time slots allocated to these non-responsive remote stations. When only a fraction of the remote users have data messages to send, an enormous amount of channel capacity is wasted in the empty time slots of an implicit polling system.

Therefore, a need exists for an improved multi-access data communications protocol which retains the collision-avoidance advantages of a noncontention-based channel access protocol, while circumventing the disadvantages of the enormous overhead commonly associated with customary polling protocols.

OBJECTS AND SUMMARY OF THE INVENTION

Accordingly, it is an object of the present invention to provide a data communications network which is adapted to communicate between a central station and a number of remote stations over a single wireless communications channel without collisions.

A further object of the present invention is to provide an improved noncontention-based multiple-access signalling protocol for a data communications network which efficiently utilizes a single channel even when only a fraction of the users have data messages to send at a given time.

Another object of the present invention is to provide an improved multiple-access signalling protocol which is particularly adapted for use with a large number of portable battery-powered computer devices communicating with a central station via an infrared link.

These and other objects are achieved by the present invention which, briefly stated, is a method and means for providing data communications between a central station and a plurality of remote stations using a two-stage reservation-based polling protocol. During the first stage of the protocol, the central station provides a synchronization signal to all of the active remote stations to define the start of a "reservation request period," and allocates fixed time slots during which any active remote station having a data message to transmit may request access and reserve a portion of the channel for their data messages. During the second stage or "polled data transfer period," the central station polls only those active remote stations that have a data message to transmit and have requested access to the channel, i.e., a "requesting" active remote station. In response to the poll, the polled remote stations will then transmit their data message in their previously-reserved data slots. If desired, the central station may also return an acknowledgement signal to the remote stations upon successful reception of each data message. Furthermore, the order of both the incoming data messages (from the remote stations to the central station) and the outgoing data messages (from the central station to the remote stations) can be controlled by the central station based upon various priority requirements.

According to one embodiment of the present invention, a method is provided for controlling data communications between a central station and a plurality of remote stations, wherein the method comprises the steps of: transmitting a synchronization signal from the central station to the plurality of remote stations, the synchronization signal defining the start of a corresponding plurality of time slots; receiving the synchronization signal in the plurality of remote stations, waiting for a predetermined time slot, and transmitting a positive access request signal from only those remote stations having a data message to transmit; receiving the positive access request signals in the central station, determining which remote stations transmitted the positive access request signals, and sequentially transmitting a plurality of access confirmation signals in response, each of the access confirmation signals including a particular identification code corresponding to each and only those particular remote stations which transmitted a positive access request signal and receiving the plurality of access confirmation signals in the particular remote stations, determining which access confirmation signal includes the proper identification code corresponding to each remote station, and transmitting a data message signal in response to the determination of the proper identification code.

According to another embodiment of the present invention, a data communications system is provided having a central station and a plurality of remote stations communicating over a half-duplex communications channel under the control of the central station, wherein all of the remote stations may not require access to the channel at any given time, and wherein no two remote stations can contend for the channel at any given time. The data communications system includes a central station comprising: circuitry for performing implicit polling of all remote stations during a first period of time to determine which remote stations require access to the channel, and circuitry for performing explicit polling during a second period of time of only those remote stations which require access to the channel; and the system further including a plurality of remote stations, each comprising: circuitry for responding to the implicit polling of all remote stations during the first period of time only if the particular remote station requires access to the channel, and circuitry for responding to the explicit polling during the second period of time.

In this way, the benefits of the implicit polling procedure are realized during the reservation request period, i.e., no individual polling signals need to be sent to each remote station during this first stage. Since no data messages are sent during the reservation request period, the preassigned time slots can be extremely short, thus overcoming the disadvantage of having fixed-length data slots normally associated with implicit polling. During the polled data transfer period, explicit polling signals are sent by the central station to only those remote stations that had requested access during the reservation request period. Therefore, the advantages of explicit polling are achieved, in that no empty data slots will occur. However, the enormous overhead commonly associated with explicit polling protocols is avoided, since polling signals are not always sent to all active remote stations.

BRIEF DESCRIPTION OF THE DRAWINGS

The features of the present invention which are believed to be novel are set forth with particularity in the appended claims. The invention itself, however, together with further objects and advantages thereof, may best be understood with reference to the following description when taken in conjunction with the accompanying drawings, in which:

DETAILED DESCRIPTION OF THE PREFERRED EMBODIMENTS

Figure 1:
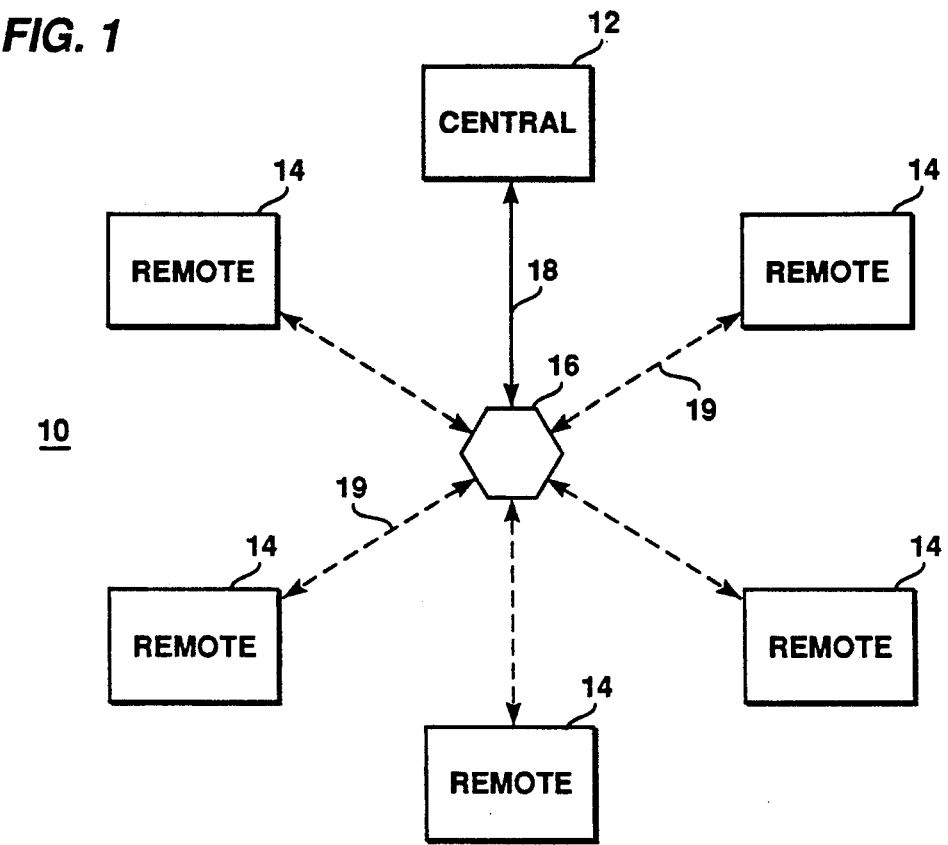
FIG. 1 is a general block diagram of the wireless data communications network according to the present invention; .

Referring now to FIG. 1, a general block diagram of a wireless multipoint data communications system 10 is shown. The system comprises a central station 12 and a number of remote stations 14. Central station 12 communicates with remote stations 14 through an optical infrared transceiver 16 coupled to the central station via a hard-wired link 18. Each of the remote stations 14 includes an optical infrared transceiver which communicates with the central station by sending and receiving data messages over an infrared link 19. Depending upon the type of network, the central station may utilize the data messages itself, or route the data messages on to a different station in a local area network.

In the preferred embodiment, each of the remote stations is a portable, hand-held, battery-powered computer having an integrated infrared transceiver, as will be described in detail below. The remote stations also include a keypad for data input, and a display for data output. Although the present invention is particularly adapted for two-way communications over a single-frequency infrared channel transmitting bursts of data packets in the half-duplex mode of operation, the reservation-based polling protocol can also be used in full-duplex operation as well as half-duplex operation over single-frequency or split-frequency channels. In the preferred embodiment, infrared link 19 has a 1 MegaHertz data rate using the differential Manchester encoding scheme. However, the reservation-based polling protocol is not limited for use with only wireless links or the particular type of channel or data communications scheme shown here.

Figure 2:
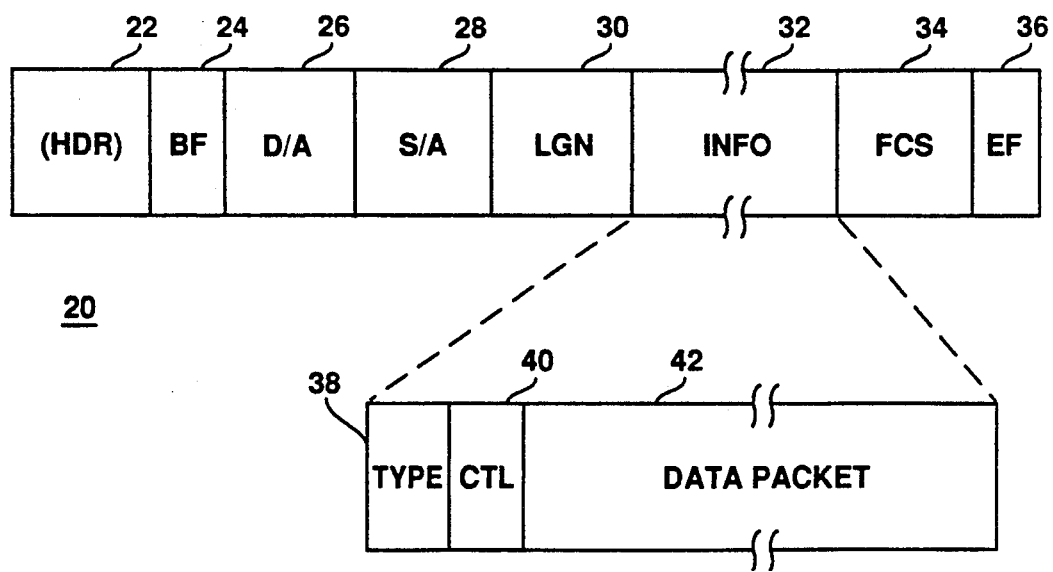
FIG. 2 is a pictorial representation of the channel frame format utilized in the multiple-access signalling protocol of the present invention.

FIG. 2 illustrates the specific channel frame format 20 used during the protocol for all information transfer and supervisory commands. The frame format of the invention basically follows the High-level Data Link Control (HDLC) data communications line protocol specification of the CCITT, or the Synchronous Data Link Control (SDLC) protocol specified by IBM. Hence, the published detailed specifications for the HDLC or SDLC protocols may be referred to for a further understanding of the common subject matter.

As shown in FIG. 2, each frame is subdivided into a number of individual fields, wherein each field is comprised of a number of 8-bit bytes. The following paragraphs describe channel frame format 20:

Header (HDR) 22: This field is optional, and contains an appropriate number of bytes of signalling information which can be used for synchronizing transmission between the central and remote stations. Header field 22 may also be used as a signalling preamble to wake-up the remote stations from their power-conserving sleep mode (described below).

Beginning of Frame Flag (BF) 24: This 1-byte field indicates the beginning of a frame, and is comprised of the 8-bit flag sequence 01111110.

Destination Address (D/A) 26: This field contains the 2-byte address of the station to which the frame is being sent. In other words, in a polling frame, the D/A field identifies the particular remote station being polled by the central station. In a data message frame, the D/A field identifies the central station as the destination for the data message being sent by the remote station. Each of the stations is assigned a unique identification code, or address. The remote stations typically have their addresses programmed into read-only memory. However, a dynamic address determination procedure could also be used. A value of FFFF hex in this field denotes a broadcast frame, which would be received by all stations.

Source Address (S/A) 28: This field is the 2-byte address of the station sending the frame. To ensure the integrity of the data being transmitted, both the destination and source addresses are included within each frame.

Length (LGN) 30: This 2-byte field contains the byte length of an information field 32, since the information field may vary in length.

Information (INFO) 32: This field contains the information which performs the reservation-based polling protocol for the network. Information field 32 is comprised a of 1-byte type field, a 1-byte control field, and a variable-length data packet field, all of which are described in detail below.

Frame Check Sequence (FCS) 34: This 4-byte field is used to detect bit errors which may occur during transmission. In the present embodiment, a 32-bit cyclic redundancy check (CRC) algorithm is used to detect errors in fields 26, 28, 30, and 32.

End of Frame Flag (EF) 36: The 1-byte EF field is the end delimiter of the actual frame, and contains the bit sequence 01111110.

Type Field 38: This 1-byte field determines the type of frame, e.g., whether the information contained in the frame is part of a polling cycle, a data message, a synchronization signal, etc. Some of the possible hex values for the type field are as follows:

01 = reservation sync
02 = reservation request
03 = reservation forfeit
04 = poll
05 = data message
06 = acknowledgement
07 = communications check
08 = global sync
09 = time sync
0A = membership sync
0B = membership request
0C = membership granted
0D = identification sync 0E = identification data These various types of frames will be described in detail below with respect to the timing cycle diagrams. As an example, however, the central station would transmit a frame having a 01 hex value in type field 38 to send a reservation sync frame. Furthermore, since the reservation sync frame must be received by all remote stations, the FFFF hex value for a broadcast frame must be inserted as destination address 26. Similarly, for the central station to poll a particular remote station, a type 04 hex frame is sent having the destination address of that remote station.

Control (CTL) 40: This is a 1-byte control field containing bit-mapped flags, primarily used for supervisory commands. In the preferred embodiment, control field 40 includes priority flags and retransmission flags, which will be described below.

Data Packet 42: This field is optional, since it contains the data message only when it is being sent over the channel. Therefore, the size of data packet field 42 can vary from 0 to the maximum number of bytes which can be specified in the length field 30.

Figures 3, 4, 5A, 5B:
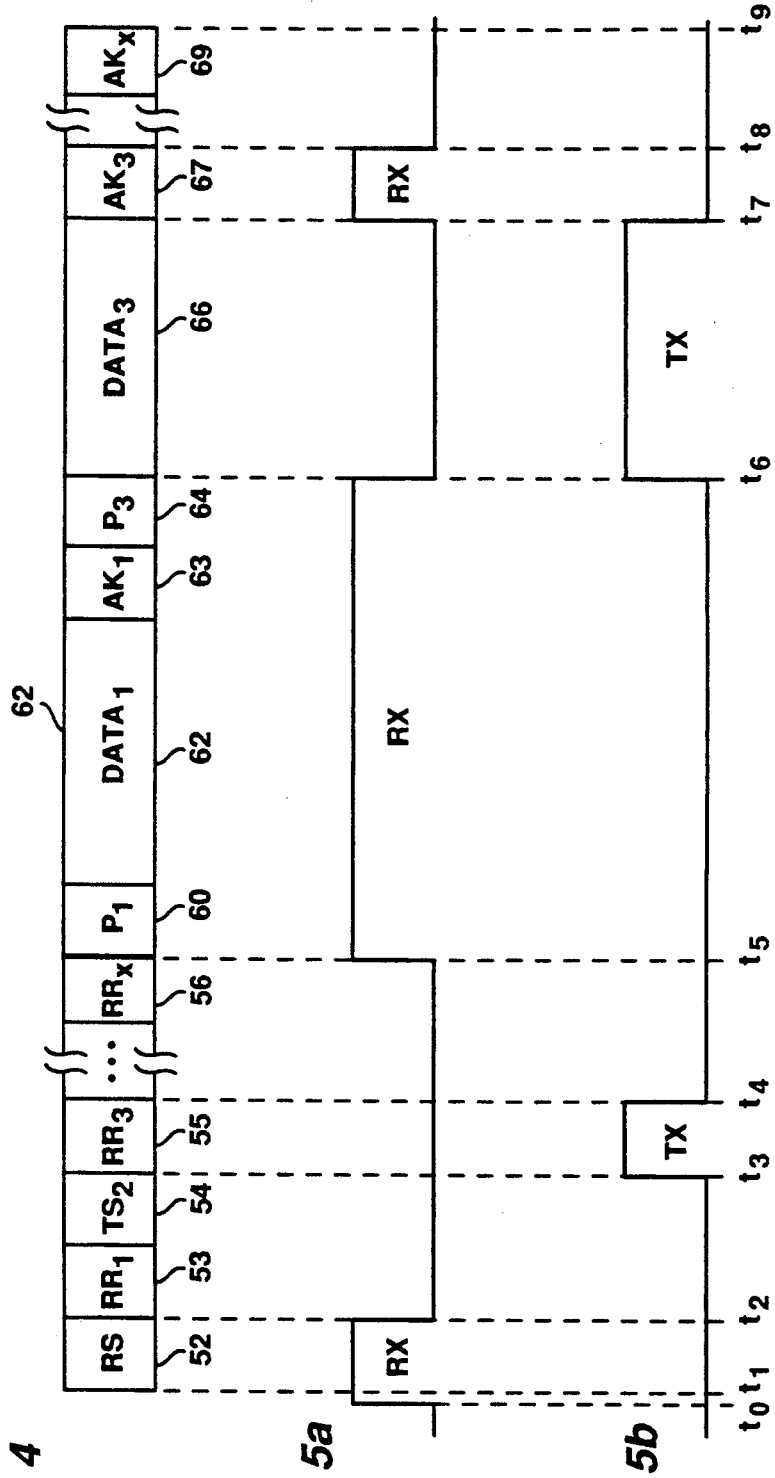
FIG. 3 is a timing cycle diagram illustrating the two-stage reservation-based polling protocol of the present invention.
FIG. 4 is a timing cycle diagram similar to that of FIG. 3, wherein acknowledgement signals are returned to the remote stations after each data message.
FIGS. 5a and 5b are timing diagrams representing the power consumption of the remote station receiver and transmitter, respectively, during the reservation-based polling protocol timing cycle of FIG. 4.

FIG. 3 illustrates a typical timing cycle of the reservation-based polling protocol of the present invention. The timing cycle illustrates that the channel usage is divided into a number of transmitted bursts of information frames, each having the frame format described above. The protocol is cyclical with each cycle consisting of a reservation request period and a polled data transfer period. In general, implicit polling is performed during the reservation request period, and explicit polling—of only those remote stations which requested access to the channel—is performed during the polled data transfer period.

To initiate the cycle, the central station transmits a reservation sync RS frame 52 to all the remote stations. The reservation sync frame is issued periodically, and it defines the start of a number of time slots. In the preferred embodiment, the central station sends a reservation sync frame once every second. Every remote station has a preassigned waiting period that will begin upon the reception of the reservation sync frame. These waiting periods are illustrated as time slots TS in FIG. 3, which fill up the remainder of the reservation request period.

Since remote station 1 has been assigned the first time slot, it issues a reservation request RR frame 53 if it has data to transmit on the channel. Hence, the first time slot has been replaced with the reservation request frame $RR_1$ transmitted from remote station 1. As seen in the example of FIG. 3, no reservation request frame was issued in time slot 2 (frame 54), and a reservation request frame $RR_3$ was issued from remote station 3 in time slot 3 (frame 55). In the example shown, a maximum number X denotes the number of remote stations in the network, and, accordingly, the number of preassigned time slots. (See frame 56.) Note that, in this example, the absence of a reservation request frame in a time slot represents a negative access request signal to the central station. As will be seen below, an alternate embodiment of the protocol always returns either a positive or negative access request signal to the central station.

After every station has been given a chance to make a reservation, the central station will switch to a modified explicit polling mode, wherein it will sequentially issue an invitation to transmit to every remote station that made a reservation. As illustrated in FIG. 3, the central station polls the first remote station during frame 60 with poll frame $P_1$, since remote station 1 sent its reservation request frame $RR_1$ during frame 53. Immediately upon receiving the poll signal addressed to remote station 1, that station responds with its data packet $DATA_1$ during frame 62. The central station then checks its poll list to determine which remote station is to be polled next. In the example shown, remote station 3 is polled via poll frame $P_3$ during frame 64, and it responds with its data packet $DATA_3$ during frame 66. The polling ends upon the completion of the response of the last station on the list, which, in this case, was remote station 3.

Priority message capability is also provided for in the reservation-based polling protocol of the present invention. Recall that the control field 40 of the channel frame format 20 (FIG. 2) includes a number of bit-mapped priority flags. In the preferred embodiment, four levels of priority can be implemented using two priority flag bits. If any remote station had a priority message to send, then that station would set its priority flags to the appropriate priority level, and transmit a reservation request RR frame to the central station in its preassigned time slot during the reservation request period. Upon receipt of this reservation request frame containing priority information, the central station would rearrange the poll list into priority-level order. Accordingly, the central station would poll the remote stations in priority-level order.

The timing cycle diagram shown in FIG. 3 can be used to illustrate the reservation-based polling protocol with priority-level polling. Assume that the time slots $TS_1$, $TS_2$, $TS_3$, ... $TS_x$ (frames 53-56) of the reservation request period are sequentially assigned to correspond with six remote stations 1-6. If all six remote stations had non-priority messages to send, then each would send its reservation request RR frame during the appropriate time slot, and the central station would poll each remote station in numerical order, i.e., the poll list would appear as: $P_1$, $P_2$, $P_3$, $P_4$, $P_5$, $P_6$. If, however, remote station 3 had a level-one priority message to send, and remote station 6 had a level-two priority message to send, then these stations would indicate such using the priority flags in the control fields of their reservation request frames. The central station would then re-order its poll list to appear as: $P_3$, $P_6$, $P_1$, $P_2$, $P_4$, $P_5$. Thus, the remote stations are polled in priority-level order. Numerous other multiple-level priority message schemes can be used with the present invention, a few of which will be described below.

FIG. 4 represents a similar timing cycle diagram to that of FIG. 3, with the addition that an acknowledgement signal is transmitted from the central station to the remote station after the reception of each data message from the remote station. In order to send an acknowledgement signal during a frame, the central station issues a type 06 hex acknowledgement frame to the appropriate destination address.

The example of FIG. 4 illustrates that, during the reservation request period, remote stations 1, 3, and X have transmitted reservation request frames 53, 55, and 56, respectively. Therefore, during the polled data transfer period, each of these three remote stations is polled. As before, a first poll frame $P_1$ is issued from the central station in frame 60, and data packet $DATA_1$ from remote station 1 is returned during frame 62. However, now an acknowledgement frame $AK_1$ is sent from the central station to remote station 1 during frame 63. A similar polling/data transfer/ acknowledgement sequence occurs for remote station 3 during frames 64, 66, and 67. As only partially shown in FIG. 4, remote station X was polled, it transmitted its data packet, and its acknowledgment frame $AK_x$ is shown being returned during frame 69.

Outgoing data message to the remote stations can be handled in a number of ways. Normally, when the central station has a message to send to a remote station, the outgoing data message would be transmitted after the incoming data messages have been received, i.e., during an "outgoing data message period" following the polled data transfer period shown in FIG. 4. Upon receipt of the outgoing data message, an acknowledgement signal would be returned by the remote station during the following timing cycle.

In the preferred embodiment, this outgoing message acknowledgement is accomplished by having the remote station return an acknowledgement frame in response to a poll frame during the following polled data transfer period. Alternatively, acknowledgement flags may be used in the control field of a reservation request frame, such that a separate acknowledgement frame would not be necessary. For example, in response to a reservation sync frame, the remote station which has received the outgoing data message from the central station would send a reservation request frame during its appropriate time slot—whether or not it had an incoming data message to send to the central station. Therefore, the acknowledgement flags in the reservation request frame would inform the central station whether or not the remote station has received the previous outgoing data message and/or whether or not it is requesting access to the channel.

If the remote station received an erroneous data message, then a negative acknowledgment frame would be returned to the central station. If the central station received neither an acknowledgement frame nor a negative acknowledgement frame from the remote station, then the central station would retransmit the same data message up to three times before continuing to communicate with other remote stations.

If the outgoing data messages have been assigned a priority level, then the outgoing data message protocol described above is modified to accommodate that priority. Since four levels of priority are available, the priority order of both the incoming data messages and the outgoing data messages can be controlled by the central station during the polled data transfer period. For example, an outgoing alarm data message having a level-one priority would be transmitted by the central station before it polls the active remote stations for incoming data messages of a lower-order priority level. Furthermore, within each priority level, an incoming data message always has a higher priority than an outgoing data message. For example, an incoming data message of level-one priority would be received by the central station before an outgoing data message of level-one priority would be transmitted. Nevertheless, a level-one priority message in either direction has priority over a data message of any other priority level.

Depending upon the requirements of the particular data communication system, it may be advantageous for the central station to track and report on the number of active remote stations in the network—whether or not each remote station has a data message to send. For this purpose, the central controller would issue a type 08 hex global reservation sync frame to all of the remote stations. When a remote station receives this frame, it responds with a type 02 hex reservation request frame if it has data to send, or it responds with a type 03 hex reservation forfeit frame if it does not. If a particular remote station does not respond to the global reservation sync frame, the central station assumes that the particular remote station is not presently active. In this manner, all of the active remote stations will be accounted for by the system without affecting the throughput of the data communications channel.

In another embodiment of the system, if any requesting remote station does not respond to a poll frame from the central station, or if a data error occurred during the frame, the central station would immediately transmit a type 07 hex communications check frame, which instructs the particular remote station to acknowledge its presence by returning a communications check frame. If still unsuccessful after sending three consecutive communications check frames to a particular remote, the central station moves on to poll the next remote station in its poll list. The particular remote station keeps the data packet which it did not get across to the central station for later transmission.

In response to the next received reservation sync frame, the particular remote station would issue a reservation request for transmission of the same missing data packet. That reservation request, however, will contain a retransmission flag in the control field (40 of FIG. 2). When the central station receives the retransmission flag, it elevates the effective priority of that reservation request to a higher priority than first-time reservation requests. The central station then modifies its polling list such that these high priority remote stations are polled before the non-priority stations.

As mentioned above, the central station sends three consecutive communications check frames in an attempt to receive the missing data packet from the particular remote station. If, however, the central station issues the third communications check frame and receives no data packet from the remote station, it will continue in its polling sequence to poll the remaining remote stations. It will be up to the remote station to reissue another reservation request during the next cycle. Similarly, if the remote station issues a reservation request, but does not receive a poll before the next reservation sync is received, it sends another reservation request with a retransmission flag. If a remote station has sent a data packet in response to a poll, and receives no acknowledgment from the central controller, it will also follow the retransmission procedure described above.

Periodically, the central station issues a special type of frame called a time sync frame. A type 09 time sync frame contains the current network time, which is sent during the polled data transfer period such that it does not affect the frequency of the reservation sync frames. The time sync information could alternatively be inserted into the data field of the reservation sync frame. Upon receipt of this time sync information, all remote stations set their internal clocks to this value of network time.

The timing diagrams of FIGS. 5a and 5b illustrate the sleep mode of remote station 3. During the sleep mode, the controller in the remote station disables the infrared transmitter and receiver circuitry, as well as any other circuitry such as a communications processor which is not being used at the time. This sleep mode ensures minimum power consumption to extend the life of the battery. FIG. 5a represents the power consumption of the remote station receiver, and FIG. 5b represents the power consumption of the remote station transmitter. These two timing diagrams correspond to the timing cycle shown in FIG. 4, wherein acknowledgment frames are utilized.

Since the reservation sync frames are periodic, the remote station can be programmed to periodically enable its receiver to wait for a reservation sync frame. Accordingly, as shown in FIG. 5a, the receiver of remote station 3 is turned on at time $t_0$, which precedes the occurrence of the reservation sync frame RS at time $t_1$ by a sufficient amount to account for clock tolerances. After the reservation sync frame has been received, the receiver is disabled at time $t_2$.

At time $t_3$, the transmitter circuitry is enabled such that the reservation request frame $RR_3$ can be transmitted during time slot 3. At time $t_4$, the transmitter returns to the sleep mode. At time $t_5$, the reservation request period has ended, and the polled data transfer period has begun. Accordingly, remote station 3 must enable its receiver such that it can wait for its poll frame $P_3$. At time $t_6$, the poll $P_3$ has been received such that the receiver can be disabled. However, the transmitter is immediately enabled since data packet $DATA_3$ must be transmitted during frame 66. From times $t_7$ to $t_8$, acknowledgement frame $AK_3$ is being received by remote station 3. After time $t_8$, the remote station can return to its sleep mode until the next cycle. As can now be seen, the sleep mode is used by the remote station to conserve battery power when the central station is communicating with other remote stations. Various other sleep mode configurations may also be used, particularly since many of the communications processors used in the remote stations may include their own internal power conservation circuits and software.

Figure 6:
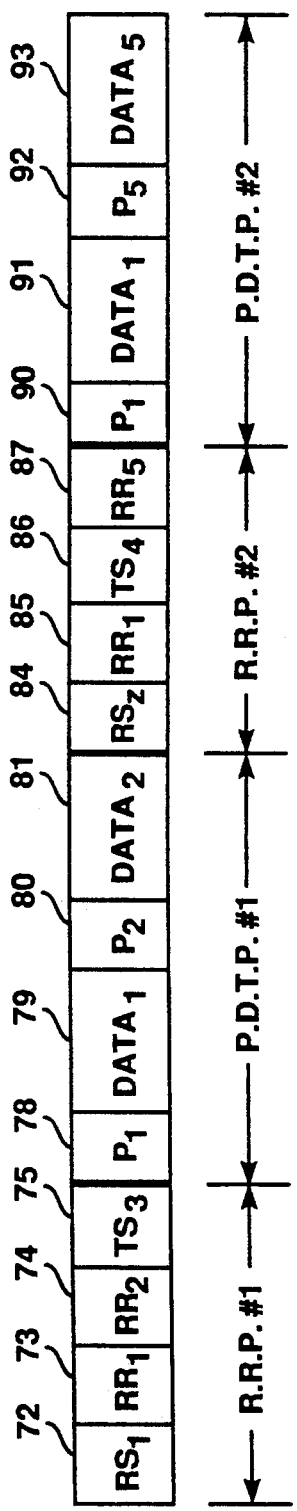
FIG. 6 is another timing cycle diagram representing an alternate embodiment of the present invention, wherein the protocol has been modified to include multiple reservation request periods.

Turning now to FIG. 6, an alternate embodiment of the reservation-based polling protocol of the present invention is shown. In this embodiment, the remote stations are implicitly polled in a number of groups, such that explicit polling occurs directly following the implicit polling of a particular group of remote stations. In this embodiment, high priority users are assigned to more than one group such that they would have greater access to the channel. As shown in the figure, each reservation sync frame RS would include a sequence number (1, 2, etc.) in the data packet field. Each sequence number would correspond to a different set of time slot assignments and/or group membership lists. When a particular remote station received a reservation sync frame having a specific sequence number, the remote station would have to observe the sequence number and set its waiting time accordingly.

More specifically, in the example presented in FIG. 6, the overall timing cycle is comprised of two reservation request periods (R.R.P.#1 and #2) and two polled data transfer periods (P.D.T.P.#1 and #2). During the first reservation request period, a reservation sync frame having a sequence number 1, i.e., $RS_1$ is sent by the central station during frame 72. A high priority user, such as remote station 1, would respond with a reservation request frame $RR_1$ during frame 73. A lower priority remote station 2 may respond during frame 74, and remote station 3 has not responded since it has no data message to send during time slot 3 in frame 75.

During the first polled data transfer period, the polling of high priority remote station 1 occurs during frames 78 and 79, and the polling of low priority remote station 2 occurs during frames 80 and 81. During the second reservation request period, a reservation sync frame $RS_2$ having a sequence number 2, is issued from the central station at frame 84. The first remote station, which has been assigned a high priority, can again issue its reservation request frame $RR_1$ at frame 85, since it has been programmed to respond to either sequence number 1 or 2. Low priority remote stations 4 and 5 are assigned time slots 86 and 87, respectively, and remote station 5 has responded with a reservation request $RR_5$ as shown. During the second polled data transfer period, the polling of high priority remote station 1 takes place in frames 90 and 91. Finally, the polling of low priority remote station 5 occurs during frames 92 and 93. In this manner, a high priority user can be granted access to the channel more often. As will be appreciated by those skilled in the art, numerous other types of priority time slot reassignments and/or user group assignments can be configured using sequence numbers and multiple reservation request periods.

Figure 7:
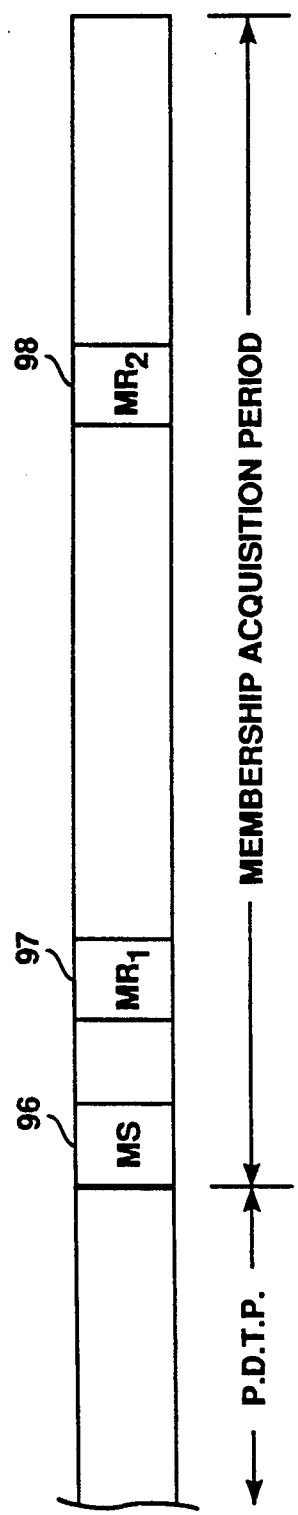
FIG. 7 is a partial timing cycle diagram of another embodiment of the invention, wherein a membership acquisition period is appended to the polled data transfer period of FIGS. 3 or 4.

FIG. 7 illustrates still another embodiment of the invention, wherein a membership acquisition period is appended to the polled data transfer period of FIGS. 3 or 4. Dynamic network membership permits a user who is not presently a part of the communications network to gain access to the channel.

After polling the remote stations during a polled data transfer period (P.D.T.P.), the central station would begin the membership acquisition period by issuing a type 0A membership sync frame MS during frame 96, addressed to all remote stations. In response to the membership sync frame, any user wishing to become a member of the system would issue a type 0B membership request frame MR at any time during the membership acquisition period, e.g., during frame 97 or 98. This portion of the protocol would be random access, such that any remote station could transmit a request at any time in the period. When a membership request is received at the central station, the address of the requesting remote station is recorded, and a type 0C membership granted frame MG (not shown) is returned to that remote station during the next polled data transfer period. The membership granted frame contains the new time slot assignment, i.e., the waiting period, for the requesting remote. Since the length of the reservation request period is determined solely by the number of network members, and since the entire timing cycle is periodic, adding another time slot for the new member has no apparent affect upon the previous network members.

Figure 8:
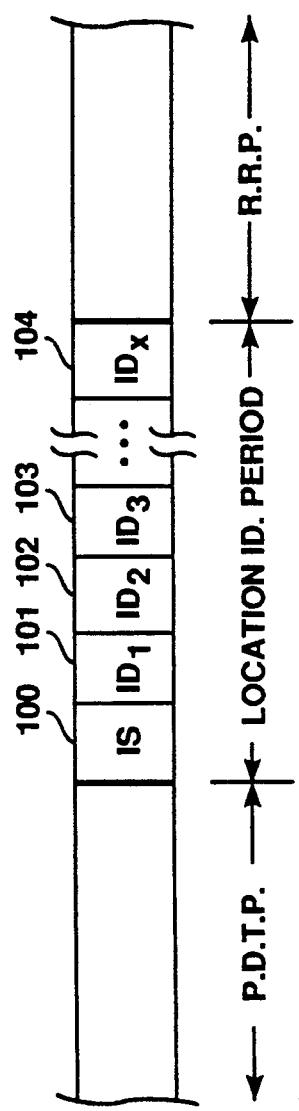
FIG. 8 is a partial timing cycle diagram of still another embodiment of the invention, wherein the protocol has been modified to include a location identification period.

FIG. 8 represents a partial timing cycle diagram of still another embodiment of the present invention. In an alternate embodiment of the wireless multipoint data communications system shown in FIG. 1, the users of the portable remote stations 14 might be disposed at different physical locations (i.e., in different rooms) but communicating with a single central station 12 through a number of distributed optical infrared transceivers 16. In such a multi-location wireless network, it is often important for the central station to maintain some status of the physical location of the portable users. To accomplish this, the reservation-based polling protocol of the present invention can be enhanced to provide this feature through the use of the location identification period shown in FIG. 8.

After a polled data transfer period has ended, the central station issues a type 0D identification sync IS frame 100, which instructs all remote stations in the network to respond with a type 0E identification data ID frame during their preassigned time slots. (See frames 101-104.) The identification data would contain information identifying the remote station's physical location. In the preferred embodiment, each infrared transceiver 16 would have a unique location code which would be contained in the particular identification sync IS frame sent to all remote stations at that particular location. Each remote station would return the transceiver location code (or codes) it received with its identification data ID frame. In this way, any particular remote station can be used at any location without requiring any reprogramming by the user.

In the alternative, the location identification function could be continuously performed during the normal reservation request period by embedding a remote identification data packet within the reservation request frames, wherein all remote stations in the system would be required to always respond during their preassigned time slots with either a positive or negative reservation request frame. Still further, the location identification function could also be performed during the normal polled data transfer period by occasionally sending poll frames to all remote stations such that they all respond with their location codes using the bit-mapped flags of the control field 40—with or without a data message packet. From this information, the central station can determine the location of each of the remote users.

Figure 9:
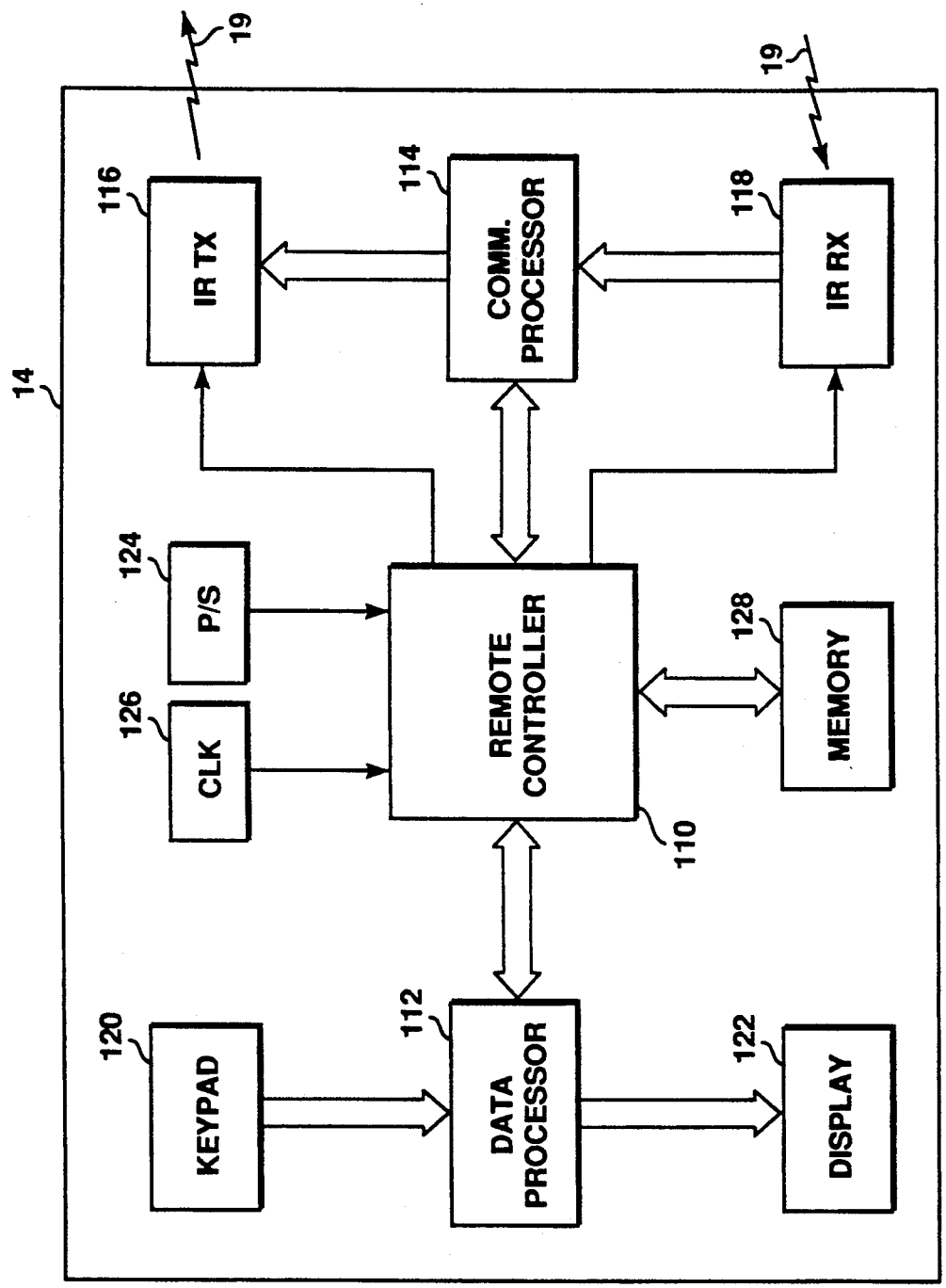
FIG. 9 is a detailed block diagram of one of the remote stations of the data communications network shown in FIG. 1.

Referring now to FIG. 9, a detailed block diagram of one of the remote stations is shown. As described above, each remote station 14 includes a transceiver which communicates with the central station via an optical-infrared data link 19. The heart of the remote station is a remote controller 110 which, in the preferred embodiment, is an 80C188 microprocessor, available from Intel Corporation, operating at 8 MHz. Remote controller 110 interfaces with a data processor 112 and a communications processor 114, such that data processor 112 can communicate over the infrared link using the reservation-based polling protocol described above. In the preferred embodiment, data processor 112 is part of a Panasonic model JT-790 hand-held computer, and communications processor 114 is an 82590 LAN interface chip also available from Intel. Although the Panasonic computer has its own keypad 120 and display 122 built in, these blocks may also be interfaced to remote controller 110.

Communications processor 114, in turn, controls an infrared transmitter 116 and an infrared receiver 118. Infrared transmitters and receivers are well-known in the art. In order to perform the control of the sleep mode for the remote station, remote controller 110 also controls the application of power from power supply 124 to the transmitter and receiver blocks. In the preferred embodiment, power supply 124 is a rechargeable nickel-cadmium battery. A clock 126 and a memory 128 are also connected to remote controller 110 in order to perform the synchronization and station identification functions of each remote station.

Figure 10:
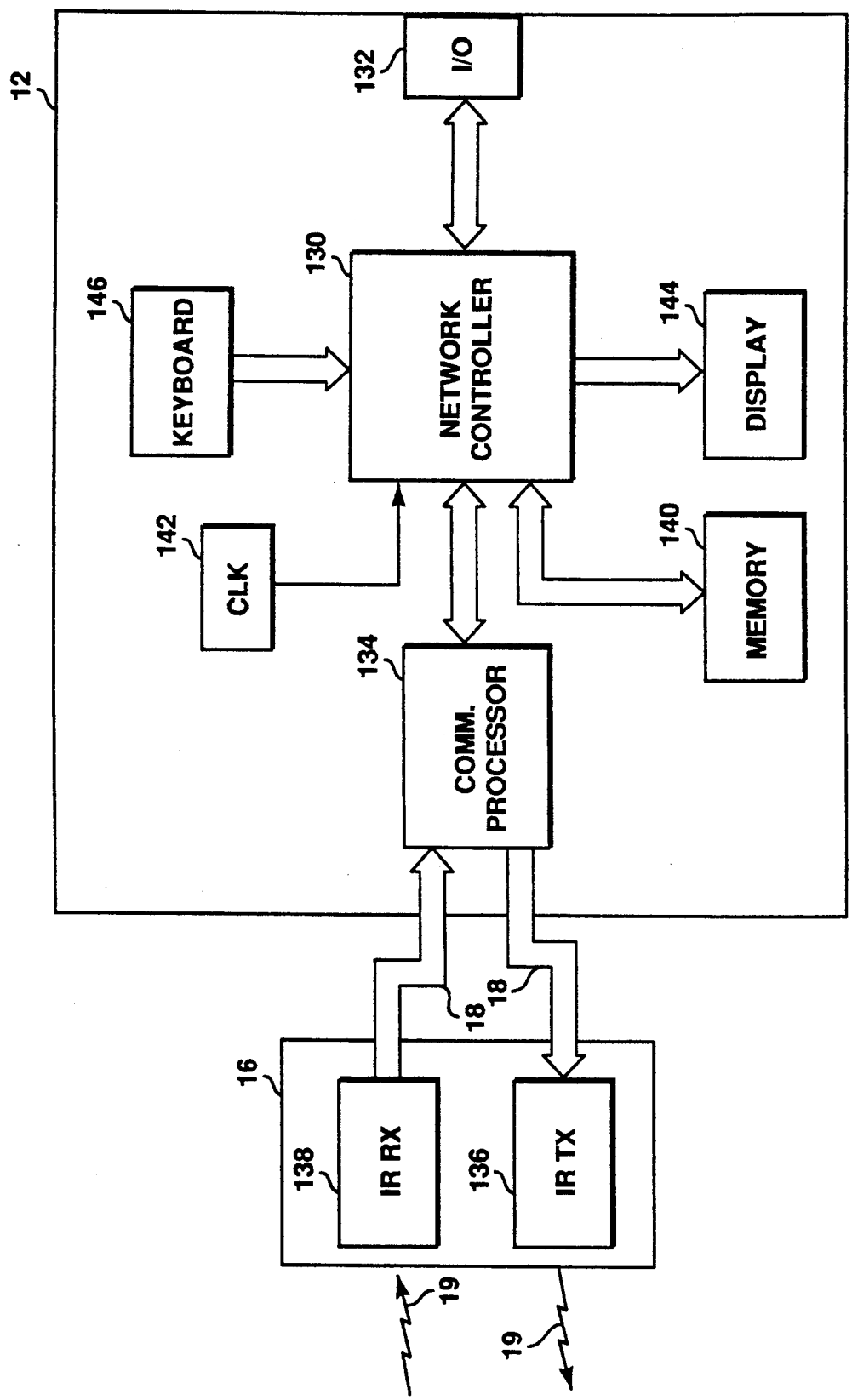
FIG. 10 is a detailed block diagram of the central station of the data communications network of FIG. 1.

FIG. 10 is a detailed block diagram of central station 12 of the data communications network shown in FIG. 1. In order to communicate with the remote stations, the central station includes an external transceiver 16. In the preferred embodiment, infrared transceiver 16 is located at a distance from central station 12, since a personal computer is used for the network controller and since the infrared link must be direct line-of-sight. A network controller 130 interfaces an input/output port 132 to a communications processor 134 such that the reservation-based polling protocol of the present invention is used to transmit and receive data from infrared link 19 to I/O port 132 via infrared transmitter 136, infrared receiver 138, and hard-wired link 18. In the preferred embodiment, the function of network controller 130 is performed by an IBM-compatible personal computer using a DOS-based operating system. The personal computer typically includes a memory 140, a clock 142, a display 144, and a keyboard 146.

In review, it can now be seen that the present invention provides an improved noncontention-based multiple-access signalling protocol for a data communications network which efficiently utilizes a single channel even when only a fraction of the users have data messages to send at a given time. The reservation-based polling protocol is particularly adapted for use with a large number of portable battery-powered computer devices communicating with a central station via an infrared link.

While specific embodiments of the present invention have been shown and described herein, further modifications and improvements may be made by those skilled in the art. All such modifications which retain the basic underlying principles disclosed and claimed herein are within the scope of the invention.

What is claimed is:

1. A method of controlling a plurality of data communications devices in accordance with a noncontention-based multiple-access signalling protocol, said signalling protocol being characterized by defining a cycle time, defining a reservation request period in a first portion of said cycle time, defining a data transfer period in a second portion of said cycle time, and assigning a number X of time slots within said reservation request period, said controlling method comprising the steps of:
    (a) outputting a sync signal in synchronization with the beginning of said reservation request period;
    (b) inputting a number Y of reservation request signals into particular time slots;
    (c) assigning a number of data slots within said data transfer period, said number of data slots corresponding to said number Y of reservation request signals;
    (d) outputting a polling signal during said data transfer period;
    (e) inputting a data packet into one of said assigned data slots; and
    (f) repeating steps (d) and (e) at least Y-1 times per said cycle time.

2. The method according to claim 1, further comprising the step of outputting an acknowledgement signal in response to the inputting of a data packet.

3. The method according to claim 1, wherein said number of data slots is not greater than said number X of time slots.

4. The method according to claim 1, wherein said outputting and inputting steps include the steps of transmitting and receiving signals over an infrared link, respectively.

5. The method according to claim 4 wherein the steps of transmitting comprises transmitting digitally modulated infrared signals arranged in frames.

6. The method according to claim 5 wherein each frame includes a destination address field, a source address field, a frame type field, and a frame check sequence field, all of fixed length, and a data packet field of variable length.

* * * * *